United States Patent Office 3,376,150
Patented Apr. 2, 1968

3,376,150
IMIDE AND POLYIMIDE SOLUTIONS
William Edward Collins, Tonawanda, N.Y., and Keith Allan Maas, Wilmington, Del., assignors to E. I. du Pont de Nemours and Company, Wilmington, Del., a corporation of Delaware
No Drawing. Filed Sept. 11, 1964, Ser. No. 395,924
6 Claims. (Cl. 106—287)

ABSTRACT OF THE DISCLOSURE

Solutions of imides and polyimides of organic diamines and organic tetracarboxylic acid in antimony trichloride alone or admixed with arsenic trichloride, useful for coating and bonding operations and analytical determinations.

---

This invention relates to difficultly-soluble aromatic imides and polyimides. More particularly, this invention is directed to novel and useful solutions of such imides and polyimides.

It is well known that most aromatic polyimides are practically insoluble in non-degrading solvents. This intractability is of course one of the outstanding properties of such polyimides. Many of them can, for example, be dissolved only with difficulty in such strong solvents as concentrated sulfuric acid and concentrated nitric acid, which acids degrade the polymers to an objectionable extent.

A great need exists for solutions containing in dissolved form the difficultly-soluble polyimides just referred to. Likewise, certain monomeric aromatic imides present solubility problems. Solutions of these materials are of great utility for coating, bonding, and many other operations, as well as having important utility for certain analytical tests such as molecular weight determinations. Other uses such as additives for lubrication greases or similar compositions will readily occur to persons in this art.

According to the present invention, it has been discovered that a specific class of aromatic imides and a specific class of aromatic polyimides are readily soluble in liquid antimony trichloride.

Although in retrospect one might reason that it is not extremely unobvious to find that antimony trichloride dissolves polyimides containing internal ether linkages, it is surprising that the non-ether type polyimides are readily dissolved. Furthermore, it is surprising to find that the antimony trichloride solutions are quite stable and useful over an extended period of time because one would perhaps expect from the acidic nature of antimony trichloride that resulting solutions would be highly acidic and therefore relatively unstable.

The polyimides within the scope of the present invention are those of at least one organic diamine and a tetracarboxylic acid.

The organic diamine has the formula
(1)

$$H_2N-R-NH_2$$

where R is one of the following two divalent groups:

(2)
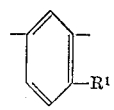

and (3)
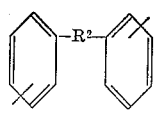

wherein $R^1$ is alkyl of 1 through 4 carbons, alkoxy of 1 through 4 carbons, trihaloalkyl of 1 through 4 carbons or phenoxy; and $R^2$ is oxygen, sulfur, carbonyl, sulfonyl, alkylene of 1 through 3 carbons or haloalkylene of 1 through 3 carbons.

Illustrative of these diamines are the following:
2,4-diamino isopropylbenzene
2,4-diamino tert-butylbenzene
2,4-diamino methoxybenzene
2,4-diamino phenoxybenzene
2,4-diamino methylbenzene
2,4-diamino ethylbenzene
2,4-diamino propylbenzene
2,4-diamino ethoxybenzene
2,4-diamino propoxybenzene
2,4-diamino butoxybenzene
2,4-diamino trifluoromethylbenzene
2,4-diamino trichloromethylbenzene
2,4-diamino tribromomethylbenzene
2,4-diamino triiodomethylbenzene
bis(4-aminophenyl) methane
bis(3-aminophenyl) methane
2,2-bis(4-aminophenyl) propane
2,2-bis(4-aminophenyl) hexafluoropropane
2,2-bis(4-aminophenyl) hexachloropropane
bis(4-aminophenyl) sulfone
bis(3-aminophenyl) sulfone
bis(4-aminophenyl) sulfide
bis(3-aminophenyl) sulfide
bis(4-aminophenyl) ether
bis(3-aminophenyl) ether
3,3'-diamino benzophenone
4,4'-diamino benzophenone The tetracarboxylic acid has the formula
(4)

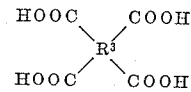

where $R^3$ is a tetravalent organic radical, e.g., aromatic, aliphatic, cycloaliphatic, heterocyclic, combination of aromatic and aliphatic, or substituted groups thereof. Illustrative are the following:

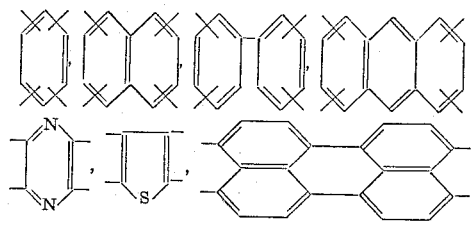

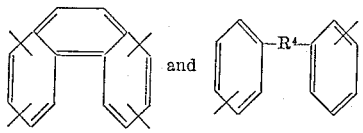

where $R^4$ is alkylene of 1–3 carbon atoms, oxygen, sulfur, or one of the following:

$$-SO_2-, -\overset{O}{\underset{\|}{C}}-, -\overset{O}{\underset{\|}{C}}-O-, -\overset{O}{\underset{\|}{C}}-\overset{H}{\underset{|}{N}}-, -\overset{O}{\underset{\|}{C}}-\overset{R^5}{\underset{|}{N}}-, -\overset{}{\underset{R^5}{N}}-$$

$$-\overset{R^5}{\underset{R^6}{Si}}-, -O-\overset{R^5}{\underset{R^6}{Si}}-O-, -\overset{R^5}{\underset{\overset{\|}{O}}{P}}- \text{ and } -O-\overset{R^5}{\underset{\overset{\|}{O}}{P}}-O$$

wherein $R^5$ and $R^6$ are alkyl or aryl, and substituted groups thereof.

In these acids every carbonyl group above is attached directly to a separate carbon atom of the aromatic radical, the carbonyl groups being in pairs, the groups of each pair being adjacent to each other. Adjacent means ortho or peri, so that the dicarboxylanhydro rings are 5- or 6-membered, respectively.

The preferred acids are the aromatic tetracarboxylic acids, those in which the R³ groups have at least one ring of 6 carbon atoms characterized by benzenoid unsaturation (alternate double bonds in a ring structure), and particularly those aromatic acids wherein the 4 carbonyl groups of the acid are each attached to separate carbon atoms in a benzene ring and wherein the carbon atoms of each pair of carbonyl groups is directly attached to adjacent carbon atoms in a benzene ring of the R³ group.

Illustrative of acids are the following:

pyromellitic acid
2,3,6,7-naphthalene tetracarboxylic acid
3,3',4,4'-diphenyl tetracarboxylic acid
1,2,5,6-naphthalene tetracarboxylic acid
2,2',3,3'-diphenyl tetracarboxylic acid
2,2-bis(3,4-dicarboxyphenyl) propane
bis(3,4-dicarboxyphenyl) sulfone
3,4,9,10-perylene tetracarboxylic acid
bis(3,4-dicarboxyphenyl) ether
ethylene tetracarboxylic acid
naphthalene-1,2,4,5-tetracarboxylic acid
naphthalene-1,4,5,8-tetracarboxylic acid
decahydronaphthalene-1,4,5,8-tetracarboxylic acid
4,8-dimethyl-1,2,3,5,6,7-hexahydronaphthalene-1,2,5,6-tetracarboxylic acid
2,6-dichloronaphthalene-1,4,5,8-tetracarboxylic acid
2,7-dichloronaphthalene-1,4,5,8-tetracarboxylic acid
2,3,6,7-tetrachloronaphthalene-1,4,5,8-tetracarboxylic acid
phenanthrene-1,8,9,10-tetracarboxylic acid
cyclopentane-1,2,3,4-tetracarboxylic acid
pyrrolidine-2,3,4,5-tetracarboxylic acid
pyrazine-2,3,5,6-tetracarboxylic acid
2,2-bis(2,3-dicarboxyphenyl) propane
1,1-bis(2,3-dicarboxyphenyl) ethane
1,1-bis(3,4-dicarboxyphenyl) ethane
bis(2,3-dicarboxyphenyl) methane
bis(3,4-dicarboxyphenyl) methane
bis(3,4-dicarboxyphenyl) sulfone
benzene-1,2,3,4-tetracarboxylic acid
1,2,3,4-butane tetracarboxylic acid
thiophene-2,3,4,5-tetracarboxylic acid
3,4,3',4'-benzophenone tetracarboxylic acid
2,3,2',3'-benzophenone tetracarboxylic acid
2,3,3',4'-benzophenone tetracarboxylic acid It will be understood that the polyimides referred to above are described in terms of the diamine and tetracarboxylic acid components but that the tetracarboxylic acid component can in preparation of the polyimide derive from the corresponding dianhydrides, tetra-esters, diester diacid chlorides, or other suitable forms. The use of dianhydrides has particular advantages.

The aromatic imides within the scope of this invention have one of the following three formulas:

(5) 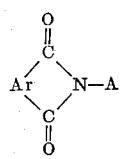

(6) 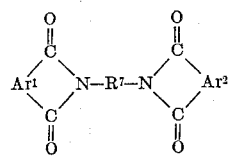

and (7) 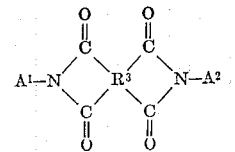

where Ar, Ar¹ and Ar² each is a phthalic, naphthalene-1,2-, naphthalene-2,3- or naphthalene-1,8- group;

A, A¹ and A² are each alkyl of 1–30 carbons or aromatic, including such groups as methyl, ethyl, propyl, butyl, amyl, hexyl, octyl, dodecyl, hexadecyl, phenyl, tolyl, naphthyl, benzyl, mesityl, cyclohexyl, phenethyl, etc.;

R⁷ is alkylene of 1–10 carbons such as methylene, ethylene, propylene, tetramethylene, pentamethylene, hexamethylene, and decylene; phenylene; naphthylene; biphenylene; anthrylene; furylene; benzfurylene; or

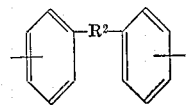

in which R² has the same meaning as above; and
R³ has the same meaning as above.

The solution of aromatic imide or polyimide is prepared by simple admixing of the imide or polyimide with liquid antimony trichloride. For pure antimony trichloride this of course means that the antimony trichloride will be at a temperature above about 73° C., the melting point of antimony trichloride. However, relatively impure antimony trichloride which can be a liquid at room temperature can also be used.

In one important aspect the solution is prepared containing additionally about 2 parts by weight of arsenic trichloride for each part by weight of antimony trichloride. It has been found that this mixed solution prepared at temperatures of about 70–100° C. can, even using pure antimony trichloride, be cooled to room temperature with the imide or polyimide remaining in solution. Such solutions are of course advantageous for uses in which it is desired to work with a liquid at room tempertaure, e.g., the measurement of inherent viscosity.

Solutions containing more than about 3 parts of arsenic trichloride per part of antimony trichloride are poor solvents for imides and polyimides. As the amount of arsenic trichloride is reduced below about 2 parts, precipitation of antimony trichloride becomes progressively more troublesome.

In the preparation of the solutions according to this invention, the imide or polyimide to be dissolved can be in any physical form but naturally smaller solid pieces dissolve more readily than larger ones. Fluid solutions are readily obtained by simple admixture of the materials. The order of admixture is not critical. Except for the degradation or decomposition temperatures of the materials being utilized, there appears to be no critical upper limit of the temperature which can be used. Although no present advantage is seen in exceeding a temperature of about 150° or 200° C., temperatures of up to the boiling point of the antimony trichloride at the pressure utilized are satisfactory.

The present invention contemplates the solution of the imide or polyimide in antimony trichloride in a range of concentrations varying all the way from extremely small amounts, such as thousandths or even tens of thousandths weight percent, up to and including the saturation point of the material in the solution at any given temperature. Solutions containing amounts of polyimide in the range of about 3 to 10% by weight have good flow characteristics and are therefore preferred. Good films can be cast from such solutions of polyimides within the scope of this invention. Attractive coatings on aluminum can be made, especially if the solvent is removed in 2 stages, first at below about 100° C., e.g., 75° C., to prevent clouding during final drying at about 200° C.

From a practical standpoint, where it is particularly desired to avoid degradation of imide or polyimide, it will be helpful to carry out this invention under anhydrous conditions. However, it will be readily apparent to persons skilled in this art that some of the imides and polyimides described above are less susceptible to degradation and in such cases the presence of water of course does less harm.

In addition to the components referred to above, the useful compositions according to this invention can of course contain other materials such as pigments, fillers, dielectric solids, abrasives, other monomers or polymers, liquids such as tetrahydrofuran, acetone, ethyl acetate, methanol, ethanol, isopropanol, etc. As will readily be understood, it is only necessary that the materials be substantially non-reactive to the polyimide, the antimony trichloride or other optional materials present in the solution, except for the formation of harmless molecular complexes.

In an important aspect, antimony trichloride can be used to form a seal or bond between an imide or polyimide surface and itself or between an imide or polyimide surface and another surface. This can be accomplished by wetting, coating, treating or otherwise applying (such as by melting a coating of powder) liquid antimony trichloride to the surface of an imide or polyimide article, sufficient to partially dissolve the imide or polyimide, and then place the treated surface in contact with the other surface to which it will be bonded. In this fashion, strong adhesion is obtained.

In a related aspect, the imide-containing or polyimide-containing solution of this invention can be used to seal and/or coat any surface or substrate with which the antimony trichloride or other optional component does not react irreversibly. For example, the solutions can be coated onto materials such as glass, stainless steel, or the like.

This invention will be more clearly understood by reference to the examples which follow. These examples which illustrate specific embodiments of the present invention should not be construed to limit the invention in any way.

Example 1

An 0.057 gram sample of film of the polypyromellitimide of bis(4-aminophenyl) ether was immersed at room temperature in about 10 cc. of methylene chloride to which a few drops of liquid antimony trichloride (impure and liquid at room temperature) was added. This mixture was allowed to stand at room temperature open to the air until the methylene chloride evaporated. It was observed that the film dissolved in the antimony trichloride. From the resulting viscous yellow liquid the polymer was recovered nearly quantitatively (0.056 gram) by treatment with water, and then with hydrochloric acid to dissolve the antimony residue. Then the mixture was filtered, and the polyimide was washed with water and with acetone.

Example 2

A small sample of the polyimide film of Example 1 was immersed for about 1 hour in antimony trichloride, which was kept liquid by warming at about 75° C. The film dissolved.

Example 3

A sample of the diphthalimide of bis(4-aminophenyl) ether, in the form of a gray powder, was dissolved in antimony trichloride at about 75° C. to produce an olive green solution.

Examples 4–20

A solution was obtained when the polyimide of each of the following combinations of tetra acid and diamine was added to antimony trichloride at about 75° C. Example:

4.—3,4,3',4'-benzophenone tetracarboxylic acid+2,4-diamino cumene
5.—2,2-bis(3,4-dicarboxyphenyl) hexafluoropropane +2,2-bis(4-aminophenyl) hexafluoropropane
6.—2,2-bis(3,4-dicarboxyphenyl) hexafluoropropane +bis(4-aminophenyl) ether
7.—Bis(3,4-dicarboxyphenyl) sulfone+bis(4-aminophenyl) ether
8.—Pyromellitic acid+bis(4-amino-2,4-diethoxyphenyl) phenyl methane
9.—Pyromellitic acid+m-xylylene diamine/bis(4-aminophenyl) ether
10.—Pyromellitic acid+m-xylylenediamine
11.—Pyromellitic acid+2,2-bis(4-aminophenyl) propane
12.—Pyromellitic acid+bis(4-aminophenyl) methane
13.—Pyromellitic acid+bis(4-aminophenyl) sulfone
14.—Pyromellitic acid+2,4-diamino cumene
15.—Pyromellitic acid+2,4-diamino isobutyl benzene
16.—Pyromellitic acid+2,4-diamino trifluoromethyl benzene
17.—Pyromellitic acid+bis(2-aminophenyl) ether
18.—Pyromellitic acid+2,4-diamino methoxy benzene
19.—Pyromellitic acid+2,4-diamino toluene
20.—Pyromellitic acid+1,5-diaminonaphthalene Example 21

To 51.90 grams of molten anhydrous antimony trichloride at 75° C. in a closed container was added 4.17 grams of a film of the polypyromellitimide of bis(4-aminophenyl) ether. The film dissolved readily to give an 7.5% by weight solution, from which a film of the polyimide was cast.

Example 22

When a powder of the polypyromellitimide of bis-(4-aminophenyl) ether was added to molten antimony trichloride, the polyimide dissolved readily.

Example 23

A 5 x 5 mm. square of 0.5 mil film of the polypyromellitimide of bis(4-aminophenyl) ether was dissolved in a 1:1 mixture (by weight) of $AsCl_3$ and $SbCl_3$ warmed at about 75° C. by a hot water bath.

Another sample of the film was found to dissolve readily in a 4:1 $SbCl_3:AsCl_3$ by weight mixture at 80° C.

Example 24

A 50 mg. sample of a film of the polypyromellitimide of bis(4-aminophenyl) ether was dissolved in 3.33 ml. of molten $SbCl_3$. To this warm solution was added 6.66 ml. of $AsCl_3$. The polyimide remained in solution, and the solution remained liquid, even when cooled to room temperature.

Example 25

The surface of a 1 mil film of the polypyromellitimide of bis(4-aminophenyl) ether was wetted with liquid antimony trichloride at room temperature. The wetted film was folded over on itself and the lap sealed in a press for two minutes at minimum pressure. Good seals were obtained at 160° C. and 200° C.

The foregoing examples can be repeated, as will be readily understood by persons skilled in this art, by substituting other materials such as those listed above for those of the specific exemplifications.

It is to be understood that the foregoing detailed description is given merely by way of illustration and that many variations may be made therein without departing from the spirit or scope of this invention.

What is claimed is:
1. A solution in antimony trichloride of a material selected from the group consisting of (A) a polyimide of an organic diamine of the formula $$H_2N-R-NH_2$$

where R is selected from the group consisting of

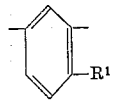

and

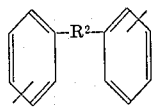

where $R^1$ is selected from the group consisting of alkyl of 1 through 4 carbons, alkoxy of 1 through 4 carbons, trihaloalkyl of 1 through 4 carbons and phenoxy; and $R^2$ is selected from the group consisting of oxygen, sulfur, carbonyl, sulfonyl, alkylene of 1 through 3 carbons and haloalkylene of 1 through 3 carbons; and a tetracarboxylic acid of the formula

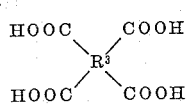

where $R^3$ is a tetravalent organic radical selected from the group consisting of

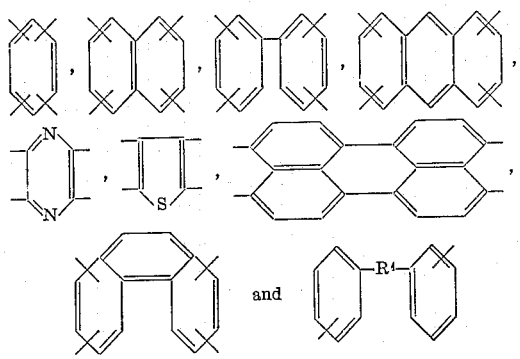

where $R^4$ is alkylene of 1–3 carbon atoms, oxygen, sulfur or one of the following:

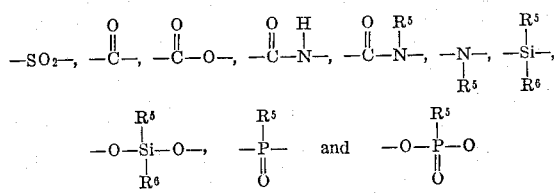

wherein $R^5$ and $R^6$ are alkyl or aryl, and substituted groups thereof; and (B) an imide selected from the group consisting of compounds of the following three formulas:

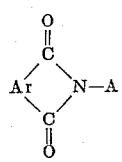

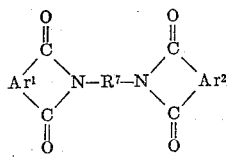

and

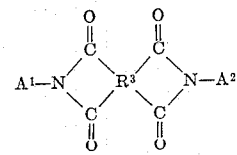

where Ar, $Ar^1$ and $Ar^2$ each is selected from the group consisting of phthalic, naphthalene-1,2-, naphthalene-2,3- and naphthalene-1,8- radicals; A, $A^1$ and $A^2$ are each selected from the group consisting of alkyl of 1–30 carbons, phenyl, tolyl, naphthyl, benzyl, mesityl, cyclohexyl and phenethyl radicals; $R^7$ is selected from the group consisting of alkylene of 1–10 carbons; phenylene; naphthalene; biphenylene; anthrylene; furylene; benzfurylene and

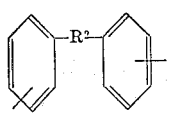

where $R^2$ has the same meaning as above; and $R^3$ has the same meaning as above.

2. A solution as set forth in claim 1 at a temperature above 73° C.

3. A solution as set forth in claim 1 additionally containing 2 to 3 parts of arsenic trichloride per part of antimony trichloride.

4. A solution as set forth in claim 1 wherein said polyimide is in 3 to 10% by weight concentration in antimony trichloride.

5. A composition comprising a polyimide of a diamine and a tetracarboxylic acid dissolved in a solvent comprising antimony trichloride, said diamine being selected from the group consisting of bis(4-aminophenyl) ether, 2,4-diamino cumene, 2,2-bis(4-aminophenyl) hexafluoropropane, bis(4-amino-2,4-diethoxyphenyl) phenyl methane, m-xylylene diamine/bis(4-aminophenyl) ether, m-xylylenediamine, 2,2-bis(4-aminophenyl) propane, bis(4-aminophenyl) sulfone, 2,4-diamino isobutyl benzene, 2,4-diamino trifluoromethyl benzene, 2,4-diamino methoxy benzene, 2,4-diamino toluene and 1,5-diaminonaphthalene, and said tetracarboxylic acid being selected from the group consisting of pyromellitic acid, diphthalic acid, 3,4,3',4'-benzophenone tetracarboxylic acid, 2,2-bis(3,4-dicarboxyphenyl) hexafluoropropane, and bis(3,4-dicarboxyphenyl) sulfone.

6. The method of preparing a solution comprising dissolving in antimony trichloride a material selected from the group consisting of (A) a polyimide of an organic diamine and a tetracarboxylic acid, said organic diamine having the formula $$H_2N-R-NH_2$$

where R is selected from the group consisting of

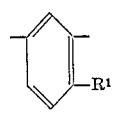

and

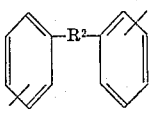

where $R^1$ is selected from the group consisting of alkyl of 1 through 4 carbons, alkoxy of 1 through 4 carbons, trihaloalkyl of 1 through 4 carbons and phenoxy; and $R^2$ is selected from the group consisting of oxygen, sulfur, carbonyl, sulfonyl, alkylene of 1 through 3 carbons and haloalkylene of 1 through 3 carbons; and said tetra-carboxylic acid having the formula

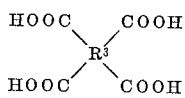

where $R^3$ is a tetravalent organic radical selected from the group consisting of

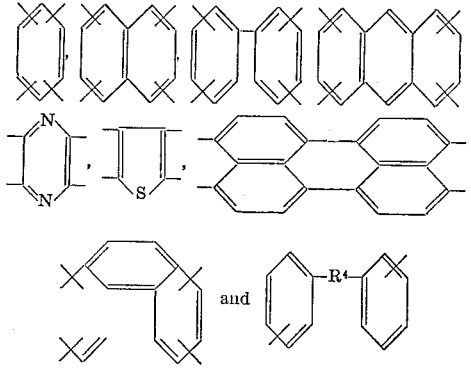

where $R^4$ is alkylene of 1–3 carbon atoms, oxygen, sulfur, or one of the following:

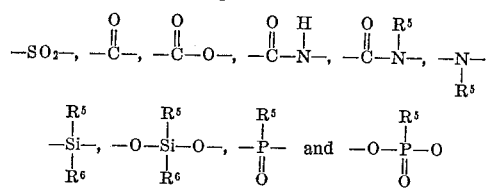

wherein $R^5$ and $R^6$ are alkyl or aryl, and substituted groups thereof, and (B) an imide selected from the group consisting of compounds of the following three formulas:

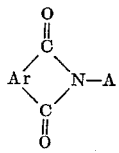

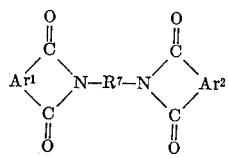

and

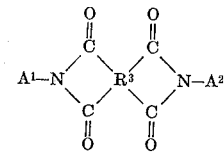

where Ar, $Ar^1$ and $Ar^2$ each is selected from the group consisting of phthalic, naphthalene-1,2-, naphthalene-2,3- and naphthalene-1,8- radicals; A, $A^1$ and $A^2$ are each selected from the group consisting of alkyl of 1–30 carbons phenyl, tolyl, naphthyl, benzyl, mesityl, cyclohexyl and phenethyl radicals; $R^7$ is selected from the group consisting of alkylene of 1–10 carbons; phenylene; naphthylene; biphenylene; anthrylene; furylene; benzfurylene; and

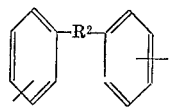

where $R^2$ has the same meaning as above; and $R^3$ has the same meaning as above.

References Cited

UNITED STATES PATENTS

| | | | |
|---|---|---|---|
| 2,731,447 | 1/1956 | Gresham et al. | 260—78 |
| 3,081,273 | 3/1963 | Caprio | 260—29.1 |
| 3,154,509 | 10/1964 | Van Garder et al. | 260—29.1 |
| 3,154,512 | 10/1964 | Parczewski | 260—31.2 |
| 3,249,588 | 5/1966 | Gall | 260—78 X |

ALEXANDER H. BRODMERKEL, *Primary Examiner.*

L. B. HAYES, *Assistant Examiner.*